United States Patent
Wang et al.

(10) Patent No.: US 9,468,009 B2
(45) Date of Patent: Oct. 11, 2016

(54) SIGNAL PROCESSING METHOD AND RELATED DEVICE

(71) Applicant: Huawei Technologies Co., Ltd., Shenzhen (CN)

(72) Inventors: Rui Wang, Shenzhen (CN); Sheng Liu, Shenzhen (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 85 days.

(21) Appl. No.: 14/601,734

(22) Filed: Jan. 21, 2015

(65) Prior Publication Data

US 2015/0139148 A1 May 21, 2015

Related U.S. Application Data (63) Continuation of application No. PCT/CN2013/073328, filed on Mar. 28, 2013.

(30) Foreign Application Priority Data

Jul. 26, 2012 (CN) .......................... 2012 1 0261420

(51) Int. Cl.
| | |
|---|---|
| *H04W 72/08* | (2009.01) |
| *H04L 5/04* | (2006.01) |
| *H04L 27/34* | (2006.01) |
| *H04B 7/04* | (2006.01) |

(52) U.S. Cl.
CPC ........... *H04W 72/082* (2013.01); *H04B 7/046* (2013.01); *H04L 5/04* (2013.01); *H04L 27/3488* (2013.01)

(58) Field of Classification Search
None
See application file for complete search history.

(56) References Cited

U.S. PATENT DOCUMENTS

| | | | |
|---|---|---|---|
| 7,729,232 B2 | 6/2010 | Wang et al. | |
| 2007/0270170 A1 | 11/2007 | Yoon et al. | |
| 2007/0291867 A1 | 12/2007 | Khan et al. | |
| 2010/0046644 A1 | 2/2010 | Mazet | |
| 2011/0002414 A1* | 1/2011 | Coldrey | H04B 7/0426 375/296 |
| 2014/0146799 A1* | 5/2014 | Park | H04W 72/042 370/336 |
| 2014/0286291 A1* | 9/2014 | Einhaus | H04B 7/024 370/329 |
| 2015/0222336 A1* | 8/2015 | Yilmaz | H04B 7/024 370/252 |

FOREIGN PATENT DOCUMENTS

| | | |
|---|---|---|
| CN | 101627583 A | 1/2010 |
| CN | 101989890 A | 3/2011 |

* cited by examiner

*Primary Examiner* — Hassan Kizou
*Assistant Examiner* — Hashim Bhatti
(74) *Attorney, Agent, or Firm* — Brinks Gilson & Lione (57) ABSTRACT

A signal processing method and related equipment are provided, which are used for reducing the number of antennas needed by a proximal user equipment to detect a low power signal. The method comprises: adjusting a pre-coding vector of a high power data stream to allow a product of the pre-coding vector and an effective receiving channel for a low power data stream equal to a constant; performing superposition coding on the low power data stream and the adjusted high power data stream; and sending the superposition-coded data stream to user equipments, wherein the user equipments comprise a user equipment at a center of a cell and a user equipment at an edge of the cell, the high power data stream is an interference while the low power data stream is desirable for the user equipment at the center of the cell.

16 Claims, 3 Drawing Sheets

SIGNAL PROCESSING METHOD AND RELATED DEVICE

CROSS-REFERENCE TO RELATED APPLICATIONS

This application is a continuation of International Application No. PCT/CN2013/073328, filed on Mar. 28, 2013, which claims priority to Chinese Patent Application No. 201210261420.6 filed on Jul. 26, 2012, both of which are hereby incorporated by reference in their entireties.

FIELD OF THE TECHNOLOGY

The present application relates to the field of communication, particularly to a signal processing method and related devices.

BACKGROUND

Superposition coding was originally used to theoretically prove a channel capacity of a broadcast channel. A principle of superposition coding is; information to be transmitted is layered into a plurality of streams, in which a first stream is transmitted at a largest power; a second stream is transmitted at a second largest power, and so on. The plurality of data streams are superposed to be transmitted simultaneously at a transmitter. A receiver far from the transmitter or a receiver with a poor channel can receive first several streams, while a receiver near the transmitter or a receiver with a good channel can receive all the streams. Therefore, the transmitter can provide service for a plurality of receivers with various qualities of signal receiving, and can provide various data rates according to conditions or channels of the receivers, so as to improve throughput.

A common scenario of superposition coding is that: a base station transmits high power data streams to remote users, and simultaneously sends low power signals to proximal user equipment; in a space for transmitting signals of the base station, the low power signals and the high power streams are multiplexed to use a same space; a remote user detects only high power data streams, while a proximal user equipment detects and eliminates high power data streams at first, and then detects low power signals. In the prior art, to detect high power data streams, the number of antennae for a proximal user equipment has to be more than or equal to a total number of the high power data streams. This condition can not be met in many cases (especially for multi-user multi-input-multi-output (MIMO)).

SUMMARY

A signal processing method and related devices are provided in embodiments of the invention, to reduce the number of antennae required for a proximal user equipment to detect low power signals.

The signal processing method provided in the disclosure includes:

adjusting, by a base station, a pre-coding vector of a high power data stream to allow a product of the pre-coding vector and an effective receiving channel for a low power data stream equal to a constant;

performing, by the base station, superposition coding on the low power data stream and the adjusted high power data stream; and sending, by the base station, the superposition-coded data stream to user equipments, where the user equipments include a user equipment at a center of a cell and a user equipment at an edge of the cell, the high power data stream is an interference for the user equipment at the center of the cell, while the low power data stream is desirable for the user equipment at the center of the cell.

The base station provide in the disclosure includes:

a data adjustment unit, configured to adjust a pre-coding vector of a high power data stream to allow a product of the pre-coding vector and an effective receiving channel for a low power data stream equal to a constant;

a superposition coding unit, configured to perform superposition coding on the low power data stream and the adjusted high power data stream; and a data sending unit, configured to send the superposition-coded data stream to user equipments, where the user equipments includes a user equipment at a center of a cell and a user equipment at an edge of the cell, the high power data stream is an interference for the user equipment at the center of the cell, while the low power data stream is desirable for the user equipment at the center of the cell.

It can be seen from the above solutions that embodiments of the invention are advantageous in that:

In the embodiments of the invention, before sending data streams to user equipments, a base station adjusts a pre-coding vector of a high power data stream to allow a product of the pre-coding vector and an effective receiving channel for a low power data stream equal to a nonzero constant, so as to achieve spatial alignment of the high power data stream; in this way, when detecting high power data streams required to be deleted, a proximal user equipment can detect all the high power data streams with antennae fewer than the number of the high power data streams to be detected.

DETAILED DESCRIPTION OF THE EMBODIMENTS

A signal processing method and related devices are provided in embodiments of the invention, to reduce the number of antennae required for a proximal user equipment to detect low power signals.

Figure 1:
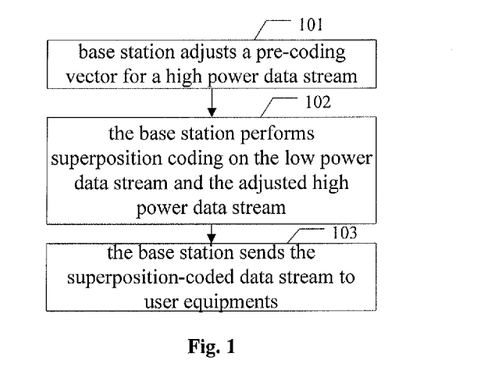
FIG. 1 is a flow chart of a signal processing method in an embodiment of the invention.

Referring to FIG. 1, in an embodiment of the invention, the signal processing method includes steps 101-103.

101, a base station adjusts a pre-coding vector for a high power data stream;

The base station adjusts a pre-coding vector for a high power data stream to allow a product of the pre-coding vector and an effective receiving channel matrix for a low power data stream equal to a nonzero constant, so as to achieve spatial alignment of the high power data stream.

The spatial alignment includes: null space alignment and signal space alignment; the null space alignment indicates aligning the high power data stream to the null space of an effective receiving channel of a proximal user equipment; and the signal space alignment indicates that the high power data stream achieves signal space alignment in space of the effective receiving channel of the proximal user equipment, i.e., after applying a receiving vector of the proximal user equipment, signal constellations formed at the proximal user equipment by the high power data streams are consistent with each other.

102, the base station performs superposition coding on the low power data stream and the adjusted high power data stream;

The base station performs superposition coding on the low power signal and the adjusted high power data stream, and in particular, a same modulation scheme is required for the high power data stream on which the signal space alignment is performed.

103, the base station sends the superposition-coded data stream to user equipments.

The base station sends the superposition-coded data stream to user equipments. In particular, the user equipments includes a proximal user equipment and a remote user equipment, where the proximal user equipment is also called a user equipment at a center of a cell, and the remote user equipment is also called a user equipment at an edge of the cell.

In the embodiment, before sending data streams to user equipments, the base station adjusts the pre-coding vector for the high power data stream to allow the product of the pre-coding vector and the effective receiving channel of the low power data stream equal to a constant, so as to achieve spatial alignment of the high power data stream; thereby when detecting high power data streams required to be deleted, a proximal user equipment can detect all the high power data streams with antennae fewer than the number of the high power data streams to be detected.

Next, scenarios applicable for the disclosure are described.

Figure 2:
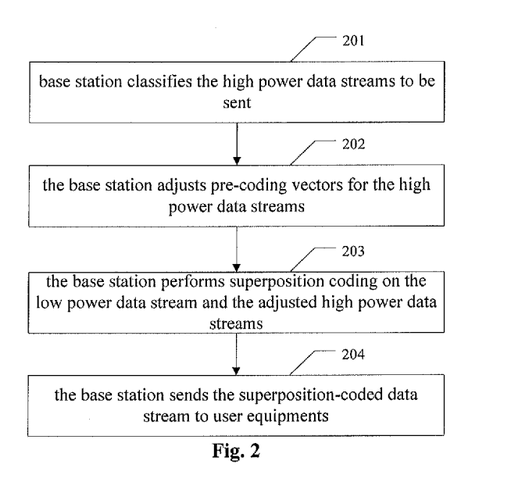
FIG. 2 is another flow chart of a signal processing method in an embodiment of the invention.

First scenario: a base station transmits to M remote users $L_1, L_2, \ldots, L_M$ high power data streams, respectively; and simultaneously, the base station transmits a low power data stream to a proximal user equipment, as shown in FIG. 2.

Channels from the base station to the M remote users are noted as $H_1, H_2, \ldots, H_M$, and a channel from the base station to the proximal user equipment is noted as I. Pre-coding vectors at the base station for $L_m$ data streams to an m-th (m=1, 2, ..., M) remote user are respectively noted as $P_{m1}$, $P_{m2}, \ldots, P_{mLm}$. A receiving matrix for the $L_m$ data streams at the m-th (m=1, 2, ..., M) remote user is noted as $Q_m$. And a receiving vector of the proximal user equipment is noted as T.

201, the base station classifies the high power data streams to be sent.

The base station classifies high power data streams to be sent, particularly as data streams for performing null space alignment and data streams for performing signal space alignment.

Optionally, the base station may set a rule for selecting the high power data streams for spatial alignment, and exemplarily: the base station may generate a set of alignment patterns, where each element in the set corresponds to one allocation pattern of the alignment patterns; and then a total system capacity corresponding to each allocation pattern is calculated according to a current condition of signal sending; finally, an allocation pattern corresponding to a largest total system capacity is selected, and high power data streams to be aligned to the null space of the channel of the proximal user equipment and high power data streams to be aligned to the effective receiving channel for sending to the proximal user equipment are selected according to the allocation pattern.

202, the base station adjusts pre-coding vectors for the high power data streams.

Zero-Forcing multi-user transmission is used for remote users, so that signals of one remote user do not interfere with signals of another remote user, i.e., $Q_M H_m [P_{n1}, P_{n2}, \ldots, P_{nM}]=0$, (n≠m).

Optionally, if the base station needs to align a high power data stream, which is to be sent to a remote user equipment, to a null space of a channel for sending to the proximal user equipment, then the base station adjusts a pre-coding vector of the high power data stream to allow a product of the pre-coding vector and an effective receiving channel of the low power data stream equal to 0. For example, if the base station is to align an i-th data stream for an m-th remote user to the null space, it is required to satisfy $TIP_{mi}=0$.

Optionally, if the base station needs to align a high power data stream, which is to be sent to a remote user equipment, to the effective receiving channel for sending to the proximal user equipment, then the base station adjusts a pre-coding vector of the high power data stream to allow a product of the pre-coding vector and the effective receiving channel Y of the low power data stream equal to a nonzero constant α. For example, if the base station is to perform signal space alignment on an i-th data stream for an m-th remote user, P is required to satisfy $TIP_{mi}=\alpha$. α is a predetermined nonzero constant same for all data streams on which the signal space alignment is performed.

203, the base station performs superposition coding on the low power data stream and the adjusted high power data streams;

The base station performs superposition coding on the low power data stream and the adjusted high power data streams, and in particular, a same modulation scheme is required for the high power data streams on which signal space alignment is performed.

Optionally, the base station may also use a same channel coding for the adjusted high power data streams. By adopting the same channel coding, the proximal user equipment can decode the aligned high power data streams uniformly, achieving more accurate estimation of the high power data streams and better effect in deleting high power data streams.

204, the base station sends the superposition-coded data stream to user equipments.

Accordingly, the proximal user equipment adopts the processing as follows:

Joint signal detection is performed on the high power data streams (interfering signals for the proximal user equipment) and the low power signals (desired signals for the proximal user equipment). The detection is based on the channel from the base station to the proximal user equipment, precoders for the high power signals and the low power signals, and modulation schemes for the high power signals and the low power signals. Low power signals before demodulation, and one or more signals of the aligned high power data streams before demodulation, are detected. The proximal user equipment deletes the aligned high power data streams at first, and finally, the proximal user equipment performs demodulation and decoding on the detected low power signals.

Optionally, if the same channel coding is used for all the high power data streams on which the signal space alignment is performed, the proximal user equipment can perform decoding on superposed high power data streams at first, to improve accuracy in detecting and deleting the high power data streams. Steps are as follows:

detecting signals of one or more aligned high power data streams before demodulation, according to channels from the base station to the proximal user equipment, precoders for the high power signals and the low power signals, and modulation schemes for the high power signals and the low power signals; performing demodulation and decoding on the aligned (signal space aligned) high power data streams according to conventional technology, and reconstructing interfering signals (the aligned high power data streams) to perform interference cancellation; and performing demodulation and decoding on the low power signals.

Figure 3:
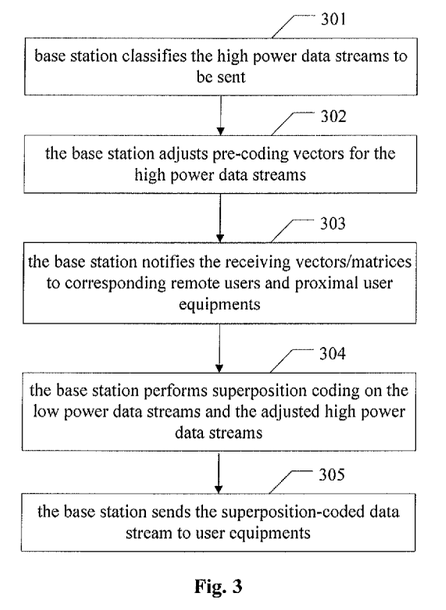
FIG. 3 is another flow chart of a signal processing method in an embodiment of the invention.

Second scenario: a base station transmits $L_1, L_2, \ldots, L_M$ high power data streams to M remote users, respectively; and simultaneously, the base station transmits N (N is less than or equal to M) low power data streams to N proximal user equipments, as shown in FIG. 3.

Channels from the base station to the M remote users are noted as $H_1, H_2, \ldots, H_M$, and channels from the base station to the proximal user equipments are $I_1, I_2, \ldots, I_N$. Pre-coding vectors at the base station for $L_m$ data streams to an m-th (m=1, 2, ..., M) remote user are respectively noted as $P_{m1}, P_{m2}, \ldots, P_{m,Lm}$, and a pre-coding vector of an n-th (n=1, 2, ..., N) proximal user is noted as $S_n$. A receiving matrix for the $L_m$ data streams at the m-th (m=1, 2, ..., M) remote user is noted as $Q_m$. A receiving vector of the n-th (n=1, 2, ..., N) proximal user equipment is noted as $T_n$.

301, the base station classifies the high power data streams to be sent.

The base station classifies the high power data streams to be sent, particularly as data streams for performing null space alignment and data streams for performing signal space alignment.

302, the base station adjusts pre-coding vectors for the high power data streams.

Zero-Forcing multi-user transmission is used for remote users, so that signals for one remote user do not interfere with another remote user, i.e., $Q_m H_m [P_{n1}, P_{n2}, \ldots, P_{nM}] = 0$, (m≠n).

An effective receiving channel $T_m I_m$ of a proximal user equipment is adjusted into a space formed by an effective receiving channel $Q_m H_m$ of a remote user, i.e., $T_m I_m \in \text{span}(Q_m H_m)$, where a receiving matrix for the $L_m$ data streams at the m-th (m=1, 2, ..., M) remote user is noted as Qm (m=1, 2, ..., N), and span($Q_m H_m$) indicates a vector subspace formed with row vectors of $Q_m H_m$ as bases. Signal space alignment is performed on all high power data streams of each remote user at a corresponding proximal user equipment, i.e., $Q_m H_m [P_{n1}, P_{n2}, \ldots, P_{nM}] = [\alpha_1, \alpha_2, \ldots, \alpha_n]$, (n=1, 2, ..., N), where $\alpha_n$ is a predetermined nonzero constant.

303, the base station notifies the receiving vectors/matrices to corresponding remote users and proximal user equipments.

304, the base station performs superposition coding on the low power data streams and the adjusted high power data streams.

The base station performs superposition coding on the low power data streams and the adjusted high power data streams. In particular, a same modulation scheme is required the high power data streams on which spatial alignment is performed.

Optionally, the base station may also use a same channel coding for the adjusted high power data streams. By adopting the same channel coding, the proximal user equipment at receiving end can decode the aligned high power data streams uniformly, achieving more accurate estimation of the high power data streams and better effect in deleting high power data streams.

305, the base station sends the superposition-coded data stream to user equipments.

There are a lot of choices of coding vectors and receiving vectors satisfying the above conditions. For easy understanding, an algorithm for calculating pre-coding vectors and receiving vectors is given as follows:

a receiving matrix of an n-th remote user and a receiving vector of an n-th proximal user equipment are calculated sequentially for n=1, 2, 3, ..., N:

supposing that the base station, the n-th remote user and an n-th proximal user equipment each has an antenna;

a matrix $V_n$ of (b+c|a)(b+c) dimensions is found to allow and $$V_n \begin{bmatrix} I_n \\ H_n \end{bmatrix} = 0$$

and $V_n V_n'$ is a unit matrix, where Vn' is a conjugate transpose matrix of $V_n$.

Noting a matrix formed by first b column vectors of $V_n$ as $W_n$, where $W_n$ is a left singular matrix (supposing that singular values are sorted descendingly) of a matrix $W_n I_n$, the receiving vector $T_n$ of the n-th proximal user equipment is a first row vector of $U_n' W_n$;

$X_n$ is found to allow $X_n H_n = T_n I_n$, and $X_n$ is taken as a first row vector of a receiving matrix $Q_n$ of the n-th remote user equipment; and then other row vectors of $Q_n$ are generated to allow that the rank of $Q_n$ is $L_n$.

Pre-coding vectors for the N proximal user equipments can be calculated with Zero-Forcing method, to ensure that signals from the base station to one proximal user equipment will be eliminated by passing through a receiving vector of another proximal user equipment.

Pre-coding vectors for the M remote users can be calculated with Zero-Forcing method, to ensure $Q_m H_m [P_{n1}, P_{n2}, \ldots, P_{nM}] = 0$, (n≠m). In addition, power and phase of high power data streams sent to the 1st, 2nd, n-th remote users by the base station are adjusted to satisfy $Q_m H_m [P_{n1}, P_{n2}, \ldots, P_{nM}] = [\alpha_1, \alpha_2, \ldots, \alpha_n]$, (n=1, 2, ..., N).

Scenarios for the embodiments of the invention are described above merely with a few examples. It can be understood that there may be more scenarios in practical applications, which are not limited here.

Accordingly, a proximal user equipment adopts the processing as follows:

Joint signal detection is performed on the high power data streams (interfering signals for the proximal user equipment) and the low power signals (desired signals for the proximal user equipment). The detection is based on the channel from the base station to the proximal user equipment, precoders for the high power signals and the low power signals, and modulation schemes for the high power signals and the low power signals. Low power signals before demodulation, and one or more signals of the aligned high power data streams before demodulation, are detected. Finally, the proximal user equipment performs demodulation and decoding on the detected low power signals.

Optionally, the one or more proximal user equipments in the above description may be a same practical proximal user equipment. In this case, channels between these proximal user equipments and the base station are totally the same, and the base station can send multiple low power data streams to one practical proximal user equipment in this way.

Optionally, in the foregoing embodiments, there may be many ways to select high power data streams for which spatial alignment are performed, depending on practical conditions. For example, it is possible to perform null space alignment on all high power data streams; or it is possible to perform signal space alignment on all high power data streams; alternatively, it is possible to perform null space alignment on some high power data streams and perform signal space alignment on rest high power data streams; or alternatively, it is also possible to perform null space alignment on some high power data streams and perform no spatial alignment on rest high power data streams (for example, after performing null space alignment on some high power data streams, the number of rest high power data streams is not larger than the number of antennae of proximal user equipment).

Optionally, the base station may set a rule for selecting the high power data streams for spatial alignment, and exemplarily: the base station may generate a set of alignment patterns, where each element in the set corresponds to one allocation pattern of the alignment patterns (such as the above ways of selecting high power data streams for spatial alignment); and then a total system capacity corresponding to each allocation pattern is calculated according to a current condition of signal sending; finally, an allocation pattern corresponding to a largest total system capacity is selected, and high power data streams to be aligned to the null space of the channel for sending to the proximal user equipment and high power data streams to be aligned to the effective receiving channel for sending to the proximal user equipment are selected according to the allocation pattern.

Figure 4:
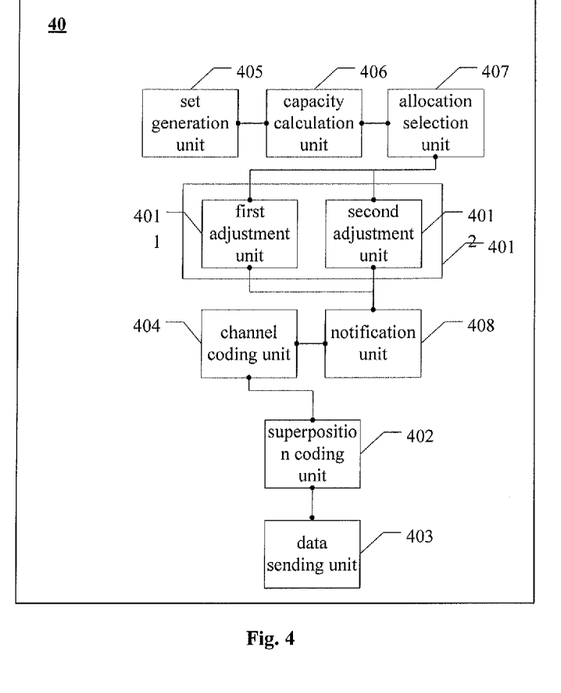
FIG. 4 is a diagram of a logical structure of a base station in an embodiment of the invention.

In the following, embodiments of a base station configured to perform the above signal processing method are described. A logical structure of the base station is shown in FIG. 4. According to embodiments of the invention, a base station 40 in an embodiment of the invention includes:

a data adjustment unit 401, configured to adjust a pre-coding vector of a high power data stream to allow a product of the pre-coding vector and an effective receiving channel for a low power data stream equal to a constant;

a superposition coding unit 402, configured to perform superposition coding on the low power data stream and the adjusted high power data stream; and a data sending unit 403, configured to send the superposition-coded data stream to user equipments.

Optionally, the data adjustment unit in the embodiment includes:

a first adjustment unit 4011, configured to adjust the pre-coding vector of the high power data stream to allow the product of the pre-coding vector and the effective receiving channel for the low power data stream equal to 0 if the base station needs to align the high power data stream, which is to be sent to a remote user equipment, to a null space of a channel for sending to a proximate user equipment; and a second adjustment unit 4012, configured to adjust the pre-coding vector of the high power data stream to allow the product of the pre-coding vector and the effective receiving channel for the low power data stream equal to a nonzero constant α if the base station needs to align the high power data stream, which is to be sent to the remote user equipment, to the effective receiving channel for sending to the proximal user equipment.

Optionally, the base station in the embodiment further includes:

a channel coding unit 404, configured to, before performing superposition coding on the low power data stream and the adjusted high power data stream, perform channel coding, with a same channel, on the high power data streams aligned to the effective receiving channel for sending to the proximal user equipment.

Optionally, the base station in the embodiment further includes:

a set generation unit 405, configured to generate a set of alignment patterns, where each element in the set corresponds to an allocation pattern of alignment patterns;

a capacity calculation unit 406, configured to calculate a total system capacity corresponding to each allocation pattern according to a current condition of signal sending; and an allocation selection unit 407, configured to select an allocation pattern corresponding to a largest total system capacity, and select, according to the allocation pattern, high power data streams to be aligned to the null space of the channel for sending to the proximal user equipment and high power data streams to be aligned to the effective receiving channel for sending to the proximal user equipment.

Optionally, the base station in the embodiment further includes:

a notification unit 408, configured to notify receiving vectors to corresponding remote user equipment and proximal user equipment before performing superposition coding on the low power data stream and the adjusted high power data stream.

Interactions among the units of the base station in the embodiment are as follows:

the data adjustment unit 401 adjusts a pre-coding vector of a high power data stream to allow a product of the pre-coding vector and an effective receiving channel for a low power data stream equal to a nonzero constant, so as to achieve spatial alignment of the high power data stream. The spatial alignment includes: null space alignment and signal space alignment; the null space alignment indicates aligning the high power data streams to a null space of the effective receiving channel of a proximal user equipment, and the signal space alignment indicates that the high power data stream achieves signal space alignment in space of the effective receiving channel of the proximal user equipment, i.e., after applying a receiving vector of the proximal user equipment, signal constellations formed at the proximal user equipment by the high power data streams are consistent with each other.

Optionally, if the base station needs to align a high power data stream to be sent to a remote user equipment to a null space of a channel for sending to a proximal user equipment, then the base station adjusts a pre-coding vector of the high power data stream to allow a product of the pre-coding vector and an effective receiving channel for a low power data stream equal to 0. If the base station needs to align a high power data stream to be sent to a remote user equipment to an effective receiving channel for sending to a proximal user equipment, then the base station adjusts a pre-coding vector of the high power data stream to allow a product of the pre-coding vector and the effective receiving channel Y of low power data stream equal to a nonzero constant α.

Optionally, before performing superposition coding on the low power data stream and the adjusted high power data stream, the set generation unit 405 may generate a set of alignment patterns, where each element in the set corresponds to an allocation pattern of alignment patterns; and then, the capacity calculation unit 406 calculates a total system capacity corresponding to each allocation pattern according to a current condition of signal sending; finally, the allocation selection unit 407 selects an allocation pattern corresponding to a largest total system capacity, and selects, according to the allocation pattern, high power data streams to be aligned to null space of a channel for sending to a proximal user equipment and high power data streams to be aligned to an effective receiving channel for sending to a proximal user equipment.

The superposition coding unit 402 performs superposition coding on the low power data stream and the adjusted high power data stream. In particular, a same modulation scheme is required for the high power data streams on which signal space alignment is performed.

Optionally, the channel coding unit 404 may also use a same channel coding for them before superposition coding. By adopting the same channel coding, a proximal user equipment can perform decoding on the aligned high power data streams uniformly, achieving more accurate estimation of high power data streams and better effect in deleting high power data streams.

Optionally, if it is required to send the low power data stream to a plurality of proximal user equipments, the notification unit 408 notifies receiving vectors to corresponding remote user equipments and proximal user equipments before performing superposition coding on the low power data stream and the adjusted high power data stream.

After the superposition coding is completed, the data sending unit 403 sends the superposition-coded data stream to user equipments.

A signal processing system is further provided in embodiments of the invention, including a base station and a proximal user equipment;

the base station is configured to adjust a pre-coding vector of a high power data stream to allow a product of the pre-coding vector and an effective receiving channel for a low power data stream equal to a nonzero constant; to perform superposition coding on the low power data stream and the adjusted high power data stream; and to send the superposition-coded data stream to user equipments;

the proximal user equipment is configured to detect the superposition-coded data stream sent by the base station, to respectively decode high power data stream and low power data stream in the superposition-coded data stream, to delete the high power data stream, and to obtain the low power data stream desired by the proximal user equipment.

One can refer to the embodiments of FIG. 2 and FIG. 3 for embodiments of the signal processing system in embodiments of the invention, which are not repeated here.

It should be understood that, according to the embodiments of the disclosure, the disclosed system, apparatus and methods may be implemented in other ways. For example, the described apparatus embodiment is merely exemplary. The division of the units is merely based on logical functions, and the units may be divided with other approaches in practice. For example, multiple units or modules may be combined, or may be integrated into another system, or some features may be omitted or not be implemented. In addition, the displayed or discussed couplings, direct couplings or communication connections between individual components may be implemented via indirect couplings or communication connections between some interfaces, devices or units, which may be electrical, mechanical or in other forms.

The units described as separate components may be or not be separated physically. The components shown as units may either be or not be physical units, i.e., the units may be located at one place or may be distributed onto multiple network units. All of or part of the units may be selected based on actual needs to implement the solutions according to the embodiments of the disclosure.

In addition, individual function units according to the embodiments of the disclosure may be integrated in one processing unit, or the units may exist separately, or two or more units may be integrated in one unit. The foregoing integrated units may be realized in a form of hardware, or realized in a form of software functional units.

If the integrated unit is implemented in the form of software function unit and the software function unit is sold or used as separate products, the software function unit may also be stored in a computer readable storage medium. Based on such understanding, the technical solutions of the disclosure, part of the disclosure that contributes to existing technologies or part of the technical solutions may be embodied in the form of a computer software product. The computer software product is stored in a storage medium and includes several instructions for instructing a computer device (which may be personal computer, server, network device or the like) to implement all of or part of the steps of the methods according to the embodiments of the disclosure. The foregoing storage medium includes various media that can store program codes, for example, USB disk, mobile hard disk drive, read-only memory (ROM), random access memory (RAM), magnetic disk, optical disk and the like.

Only specific embodiments of the disclosure are described above, which are not to limit the scope of the disclosure. Any modification or substitution obvious to those skilled in the art within the technical scope of the disclosure fall within the protection scope of the application. Therefore, the protection scope of the application shall be defined by the appended claims.

The invention claimed is:

1. A signal processing method comprising:
adjusting, by a base station, a pre-coding vector of a high power data stream to allow a product of the pre-coding vector and an effective receiving channel matrix for a low power data stream to be equal to a constant;
performing, by the base station, superposition coding on the low power data stream and the adjusted high power data stream; and
sending, by the base station, the superposition-coded data stream to user equipments, wherein the user equipments comprise a user equipment at a center of a cell and a user equipment at an edge of the cell, the high power data stream is an interference for the user equipment at the center of the cell, while the low power data stream is desirable for the user equipment at the center of the cell.

2. The method according to claim 1, wherein if the base station needs to align the high power data stream, which is to be sent to the user equipment at the edge of the cell, to a null space of a channel of the user equipment at the center of the cell, then the adjusting the pre-coding vector of the high power data stream to allow the product of the pre-coding vector and the effective receiving channel matrix for the low power data stream to be equal to the constant comprises:
adjusting the pre-coding vector of the high power data stream to allow the product of the pre-coding vector and the effective receiving channel matrix for the low power data stream to be equal to 0.

3. The method according to claim 2, wherein if the base station needs to align the high power data stream, which is to be sent to the user equipment at the edge of the cell, to an effective receiving channel for sending to the user equipment at the center of the cell, then the adjusting the pre-coding vector of the high power data stream to allow the product of the pre-coding vector and the effective receiving channel matrix for the low power data stream to be equal to a constant comprises:

adjusting the pre-coding vector of the high power data stream to allow the product of the pre-coding vector and the effective receiving channel matrix for the low power data stream to be equal to a nonzero constant α, where a is the same for all data streams on which signal space alignment is performed.

4. The method according to claim 3, before performing superposition coding on the low power data stream and the adjusted high power data stream, the method further comprising:
performing channel coding, with a same channel, on the high power data streams aligned to the effective receiving channel for sending to user equipment at the center of the cell.

5. The method according to claim 3, before adjusting the pre-coding vector of the high power data stream, the method further comprising:
generating a set of alignment patterns, wherein each element in the set corresponds to an allocation pattern of the alignment patterns;
according to a current condition of signal sending, calculating a total system capacity corresponding to each allocation pattern; and
selecting an allocation pattern corresponding to a largest total system capacity, and selecting, according to the allocation pattern, high power data streams aligned to the null space of the channel for sending to the user equipment at the center of the cell and high power data streams aligned to the effective receiving channel for sending to the user equipment at the center of the cell.

6. The method according to claim 1, wherein if it is required to send the low power data stream to a plurality of user equipments at the center of the cell, before performing superposition coding on the low power data stream and the adjusted high power data stream, the method further comprises:
notifying receiving vectors to corresponding the user equipment at the edge of the cell and corresponding user equipments at the center of the cell.

7. The method according to claim 2, wherein if it is required to send the low power data stream to a plurality of user equipments at the center of the cell, before performing superposition coding on the low power data stream and the adjusted high power data stream, the method further comprises:
notifying receiving vectors to corresponding the user equipment at the edge of the cell and corresponding user equipments at the center of the cell.

8. The method according to claim 3, wherein if it is required to send the low power data stream to a plurality of user equipments at the center of the cell, before performing superposition coding on the low power data stream and the adjusted high power data stream, the method further comprises:
notifying receiving vectors to corresponding the user equipment at the edge of the cell and corresponding user equipments at the center of the cell.

9. The method according to claim 4, wherein if it is required to send the low power data stream to a plurality of user equipments at the center of the cell, before performing superposition coding on the low power data stream and the adjusted high power data stream, the method further comprises:
notifying receiving vectors to corresponding the user equipment at the edge of the cell and corresponding user equipments at the center of the cell.

10. The method according to claim 5, wherein if it is required to send the low power data stream to a plurality of user equipments at the center of the cell, before performing superposition coding on the low power data stream and the adjusted high power data stream, the method further comprises:
notifying receiving vectors to corresponding the user equipment at the edge of the cell and corresponding user equipments at the center of the cell.

11. A base station comprising:
a data adjustment unit, configured to adjust a pre-coding vector of a high power data stream to allow a product of the pre-coding vector and an effective receiving channel matrix for a low power data stream to be equal to a constant;
a superposition coding unit, configured to perform superposition coding on the low power data stream and the adjusted high power data stream; and
a data sending unit, configured to send the superposition-coded data stream to user equipment, wherein the user equipment comprises a user equipment at a center of a cell and a user equipment at an edge of the cell, the high power data stream is an interference for the user equipment at the center of the cell, while the low power data stream is desirable for the user equipment at the center of the cell.

12. The base station according to claim 11, wherein the data adjustment unit comprises:
a first adjustment unit, configured to adjust the pre-coding vector of the high power data stream to allow the product of the pre-coding vector and the effective receiving channel matrix for the low power data stream to be equal to 0 if the base station needs to align the high power data stream, which is to be sent to the user equipment at the edge of the cell, to a null space of a channel for sending to the user equipment at the center of the cell; and
a second adjustment unit, configured to adjust the pre-coding vector of the high power data stream to allow the product of the pre-coding vector and the effective receiving channel matrix for the low power data stream to be equal to a nonzero constant α if the base station needs to align the high power data stream, which is to be sent to the user equipment at the edge of the cell, to an effective receiving channel for sending to the user equipment at the center of the cell, wherein a is the same for all the data streams on which signal space alignment is performed.

13. The base station according to claim 12, wherein the base station further comprises:
a channel coding unit, configured to, before performing superposition coding on the low power data stream and the adjusted high power data stream, perform channel coding, with a same channel, on the high power data streams aligned to the effective receiving channel for sending to the user equipment at the center of the cell.

14. The base station according to claim 12, wherein the base station further comprises:
a set generation unit, configured to generate a set of alignment patterns, wherein each element in the set corresponds to an allocation pattern of the alignment patterns;
a capacity calculation unit, configured to calculate a total system capacity corresponding to each allocation pattern according to a current condition of signal sending; and an allocation selection unit, configured to select an allocation pattern corresponding to a largest total system capacity, and select, according to the allocation pattern, high power data streams to be aligned to the null space of the channel for sending to the user equipment at the center of the cell and high power data streams aligned to the effective receiving channel for sending to the user equipment at the center of the cell.

15. The base station according to claim 11, wherein the base station further comprises:
a notification unit, configured to notify receiving vectors to corresponding user equipment at the edge of the cell and user equipment at the center of the cell of the receiving vectors before performing superposition coding on the low power data stream and the adjusted high power data stream.

16. A signal processing system, comprising a base station and a user equipment at a center of a cell; wherein:

the base station is configured to adjust a pre-coding vector of a high power data stream to allow a product of the pre-coding vector and an effective receiving channel matrix for a low power data stream to be equal to a nonzero constant; to perform superposition coding on the low power data stream and the adjusted high power data stream; and to send the superposition-coded data stream to user equipment;

the user equipment at the center of the cell is configured to detect the superposition-coded data stream sent by the base station, to respectively decode the high power data stream and the low power data stream in the superposition-coded data stream, to delete the high power data stream, and to obtain the low power data stream desired by the user equipment at the center of the cell.

* * * * *